3,658,853
17α-(2-ALKYNYL)-11β-METHYLESTRA-1,3,5(10)-
TRIENE-3,17β-DIOLS AND ESTERS THEREOF
Paul D. Klimstra, Northbrook, Ill., assignor to G. D.
Searle & Co., Chicago, Ill.
No Drawing. Filed Mar. 5, 1970, Ser. No. 16,928
Int. Cl. C07c 169/08
U.S. Cl. 260—397.5                     6 Claims

ABSTRACT OF THE DISCLOSURE

17α - (2 - alkynyl) - 11β - methylestra - 1,3,5(10)-triene - 3,17β - diols and esters thereof exhibit useful pharmacological properties, e.g. deciduogenic, and are manufactured by reaction of the corresponding 17-keto starting materials with the appropriate 2-alkynyl organometallic reagent optionally followed by acylation of the resulting hydroxy compounds.

---

The present invention is concerned with novel acetylenic steroidal alcohols and esters and, more particularly, with 17α - (2 - alkynyl) - 11β - methylestra - 1,3,5(10)-triene-3,17β-diols and esters thereof represented by the following structural formula

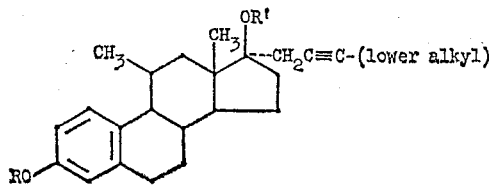

wherein R and R' can be either hydrogen or a lower alkanoyl radical.

The lower alkyl radicals encompassed by the foregoing structural representation are typified by methyl, ethyl, propyl, butyl, pentyl, hexyl, heptyl and the branched-chain isomers thereof.

Examples of the lower alkanoyl radicals within the scope of the formula are formyl, acetyl, propionyl, butyryl, valeryl, caproyl, heptanoyl and the corresponding branched-chain isomeric groups.

The novel compounds of this invention are conveniently manufactured by utilizing 3 - hydroxy - 11β-methylestra - 1,3,5(10) - trien - 17 - one as the starting material. That substance is converted to the 3 - tetrahydropyran-2'-yl ether, suitably by reaction with dihydropyran in the presence of p-toluenesulfonic acid, and that ether is allowed to react with a 2-alkynyl organometallic reagent. The reaction of 11β - methyl - 3 - tetrahydropyran-2'-yloxy - estra - 1,3,5(10)-trien-17-one with the Grignard reagent prepared from 1 - bromo - 2 - butyne and magnesium thus affords 17α - (2 - butynyl) - 11β - methyl-estra - 1,3,5(10) - triene - 3,17β - diol 3-tetrahydropyran-2'-yl ether. Cleavage of the ether protecting group to afford the free diol, i.e. 17α - (2 - butynyl) - 11β - methyl-estra - 1,3,5(10) - triene - 3,17β - diol, is readily effected by reaction with an acidic reagent such as p-toluenesulfonic acid.

The instant esters are obtained by acylation of the corresponding hydroxy compounds. When the aforementioned diols are contacted with a lower alkanoic acid anhydride or halide, preferably in the presence of a suitable acid acceptor such as pyridine or triethylamine, selective acylation of the 3-hydroxy group occurs when the process is conducted at room temperature. The reaction of 17α - (2 - butynyl) - 11β - methylestra - 1,3,5(10)-triene-3,17β-diol with acetic anhydride and pyridine at room temperature thus affords the corresponding 3-acetate. At elevated temperature acylation of the 17-hydroxy group occurs also, in the latter example thus resulting in the corresponding 3,17-diacetate.

The compounds of this invention display valuable pharmacological properties. They are, for example, hormonal agents as is evidenced by their deciduogenic properties. In addition, they lack the potent side-effects, e.g., estrogenic, possessed by related prior art compositions.

The deciduogenic property of the instant compounds is specifically illustrated by the activity of 17α - (2 - butynyl) - 11β - methylestra - 1,3,5(10) - triene - 3,17β - diol and 17α - (2 - butynyl) - 11β - methylestra - 1,3,5(10)-triene-3,17β-diol 3-acetate when tested in the following assay procedure:

Intact immature female rats weighing about 1 kg. are primed with 5 mcg. subcutaneous injections of estradiol-17β on each of 6 successive days. Starting on the day following the last priming injection and continuing on each of eight successive days thereafter, a corn oil solution or suspension of the selected dose of the test compound is administered subcutaneously. On the ninth day, the animals are sacrificed and the uteri are removed and examined histologically for evidence of decidual cell formation. A compound is considered active if it causes the appearance of decidual cells in the uterus.

The invention will appear more fully from the examples which follow. These examples are meant by way of illustration only and are not to be construed as limiting the invention either in spirit or in scope as many modifications both in materials and in methods will be apparent to those skilled in the art. In these examples, temperatures are given in degrees centigrade (° C.) and quantities of materials in parts by weight unless otherwise noted.

EXAMPLE 1

A mixture containing 3.66 parts of 3-hydroxy-11β-methylestra-1,3,5(10)-trien-17-one, 2.7 parts of dihydropyran, 0.01 part of p-toluenesulfonic acid monohydrate and 53 parts of benzene is allowed to stand at room temperature for about 16 hours, then is filtered to remove a small amount of insoluble material. To that mixture is then added 0.2 part of pyridine and the solvent is removed by distillation under reduced pressure to afford an oily residue. That oil solidifies upon standing, thus yielding 3-tetrahydropyran - 2' - yloxy - 11β-methylestra-1,3,5(10)-trien-17-one, which compound exhibits infrared absorption maxima, in chloroform, at about 3.39, 5.74, 6.21, 6.65, 8.10, 9.63 and 10.26 microns.

EXAMPLE 2

A mixture containing 1.2 parts of magnesium turnings, 0.06 part of mercuric chloride and 35 parts of ether is stirred at 0–5° and a solution of 5 parts of 1-bromo-2-butyne in 35 parts of ether is added over a period of about 90 minutes. A small quantity of iodine is added at the beginning of the latter addition in order to initiate the reaction. The mixture is cooled, then stirred for an additional hour following completion of the addition. At the end of that time a solution of 3 parts of 3-tetrahydropyran - 2'-yloxy-11β-methylestra-1,3,5(10)-trien-17-one in 45 parts of tetrahydrofuran is added dropwise with cooling over a period of about 1 hour. Stirring at 0–5° is continued for about 1 hour, following which time the mixture is heated at the reflux temperature for about 16 hours. It is then cooled and excess saturated ammonium chloride is added. The mixture is diluted with ether and the organic layer is separated, washed several times with water, dried over anhydrous sodium sulfate containing decolorizing carbon and stripped of solvent under reduced pressure to afford an oily residue containing 17α-(2-butynyl)-11β-methyl - 3-tetrahydropyran-2'-yloxyestra-1,3,5(10)-trien-17β-ol.

To the latter residue is added 0.1 part of p-toluenesulfonic acid monohydrate and 80 parts of methanol and that reaction mixture is kept at room temperature for about 45 minutes. To the mixture is then added 0.5 part of pyridine and the solvent is distilled under reduced pressure. The brown oily residue is purified by adsorption on silica gel and elution with 5% ethyl acetate in benzene. The eluted fraction is purified further by recrystallization from aqueous methanol, thus affording 17α-(2-butynyl)-11β - methylestra-1,3,5(10)-triene-3,17β-diol, melting at about 145–148°. This compound exhibits an optical rotation, in chloroform, of +38° and is further characterized by the following structural formula

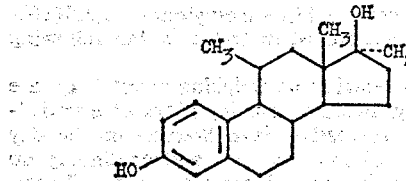

EXAMPLE 3

A mixture containing 2.3 parts of 17α-(2-butynyl)-11β-methylestra-1,3,5(10)-triene-3,17β-diol, 15 parts of acetic anhydride and 30 parts of pyridine is allowed to stand at room temperature for about 16 hours, then is diluted with methanol and water. The resulting mixture is cooled at 0–5° until separation of the oily product is complete. That oil is extracted into ether and the ether solution is washed successively with water, dilute hydrochloric acid, and dilute aqueous sodium bicarbonate, then is dried over anhydrous sodium sulfate containing decolorizing carbon. Removal of the solvent by distillation under reduced pressure affords a glass-like residue. That material is dissolved in benzene and is purified by dry chromatography on silica gel. The desired silica gel section is extracted three times with ethyl acetate and the resulting solution is evaporated to dryness under reduced pressure to afford, as an oil, 17α - (2 - butynyl)-11β-methylestra-1,3,5(10)-triene-3,17β-diol 3-acetate. This compound is represented by the following structural formula

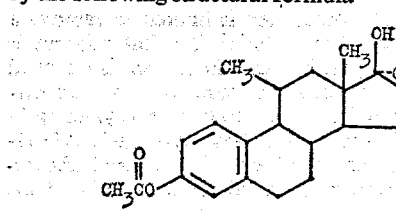

EXAMPLE 4

When an equivalent quantity of propionic anhydride is substituted in the procedure of Example 3, there is obtained 17α - (2 - butynyl)-11β-methylestra-1,3,5(10)-triene-3,17β-diol 3-propionate.

EXAMPLE 5

When an equivalent quantity of 1-bromo-2-pentyne is substituted in the procedure of Example 1, there is produced 11β - methyl-17α-(2-pentynyl)-3-tetrahydropyran-2'-yloxyestra-1,3,5(10)-trien-17β-ol.

EXAMPLE 6

When an equivalent quantity of 11β-methyl-17α-(2-pentynyl)-3-tetrahydropyran - 2' - yloxyestra-1,3,5(10)-trien-17β-ol is substituted in the procedure of Example 2, there is produced 11β-methyl-17α-(2-pentynyl)estra-1,3,5(10)-triene-3,17β-diol.

EXAMPLE 7

A mixture containing 1 part of 17α-(2-butynyl)-11β-methylestra-1,3,5(10)-triene - 3,17β - diol, 10 parts of acetic anhydride and 20 parts of pyridine is heated on a steam bath for about 4 hours, then is cooled and poured carefully into a mixture of ice and water. The resulting aqueous mixture is extracted with benzene and the benzene layer is separated, washed with water, dried over anhydrous sodium sulfate containing decolorizing carbon and concentrated under reduced pressure to afford 17α-(2-butynyl)-11β-methylestra-1,3,5(10)-triene - 3,17β-diol 3,17-diacetate.

EXAMPLE 8

By substituting an equivalent quantity of propionic anhydride and otherwise proceeding according to the processes described in Example 7, there is produced 17α-(2-butynyl) - 11β - methylestra - 1,3,5(10)-triene-3,17β-diol 3,17-dipropionate.

EXAMPLE 9

The substitution of an equivalent quantity of 11β-methyl-17α-(2-pentynyl)estra - 1,3,5(10) - triene - 3,17β-diol in the procedure of Example 3 affords 11β-methyl-17α-(2-pentynyl)-estra-1,3,5(10)-triene-3,17β-diol 3-acetate.

What is claimed is:

1. A compound of the formula

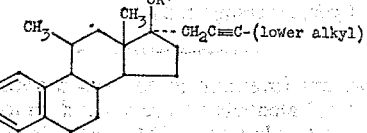

wherein R is selected from the group consisting of hydrogen and a lower alkanoyl radical, R' is hydrogen when R is hydrogen and R' is selected from the group consisting of hydrogen and a lower alkanoyl radical when R is a lower alkanoyl radical.

2. As in claim 1, a compound of the formula

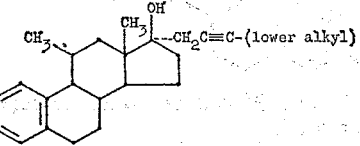

3. As in claim 1, a compound of the formula

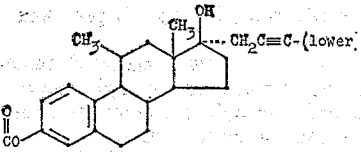

4. As in claim 1, a compound of the formula

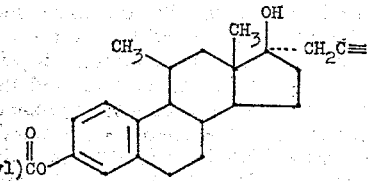

5. As in claim 1, the compound which is 17α - (2-butynyl)-11β-methylestra-1,3,5(10)-triene-3,17β-diol.

6. As in claim 1, the compound which is 17α - (2-butynyl) - 11β - methylestra - 1,3,5(10)-triene-3,17β-diol 3-acetate.

References Cited

UNITED STATES PATENTS

| | | | |
|---|---|---|---|
| 3,299,108 | 1/1967 | Baran | 260—397.5 |
| 3,377,365 | 4/1968 | Baran | 260—397.5 |

OTHER REFERENCES

Counsell et al.: J. Med. Chem. 9, 689 (1966).

HENRY A. FRENCH, Primary Examiner

U.S. Cl. X.R.

260—239.55 R, 999